United States Patent [19]

Migler

[11] Patent Number: 4,736,709

[45] Date of Patent: Apr. 12, 1988

[54] POLE AND CAGE HOUSING FOR LARGE MONKEYS

[76] Inventor: Bernard Migler, 1405 Autumn La., Cherry Hill, N.J. 08003

[21] Appl. No.: 935,964

[22] Filed: Nov. 28, 1986

[51] Int. Cl.$^4$ ............................................. A01K 31/00
[52] U.S. Cl. ..................................... 119/17; 119/120; 119/15
[58] Field of Search ................... 119/96, 98, 101, 103, 119/17, 24, 15, 19, 120, 122, 118, 147 R, 109, 29, 26

[56] References Cited

U.S. PATENT DOCUMENTS

| | | | |
|---|---|---|---|
| 1,123,044 | 12/1914 | Warnecke | 119/26 |
| 3,467,064 | 9/1969 | Glass et al. | 119/17 |
| 3,905,333 | 9/1975 | Uhrig | 119/17 |
| 4,398,500 | 8/1983 | Koronkiewicz | 119/109 |
| 4,497,279 | 2/1985 | Bell | 119/29 |

FOREIGN PATENT DOCUMENTS 2060344  5/1981  United Kingdom ................ 119/120

*Primary Examiner*—Robert Peshock
*Assistant Examiner*—Michael Lynch

[57] ABSTRACT

A device for the long-term securing or "housing" of large or aggressive monkeys on poles within an enclosure is disclosed wherein a tether with rotatable joints is connected at one end to a collar around a monkey's neck and at the other end to a ring loosely fitted around a vertical climbing pole attached to horizontal support means, with perch means, and with a source of food and water being applied to each monkey, and with removable side walls, and with doors, permitting access to each individual monkey, and with all escape routes from the device closed by a ceiling and a floor, wherein each monkey may climp up and down its climbing pole freely with the ring sliding up and down the pole, and wherein the monkeys may make close physical contact with the other monkey similarly restrained within the device without their tethers becoming entangled, and wherein a plurality of such devices may be placed with their side walls alongside each other and connected by conventional means and their side walls removed, wherein the monkeys in the adjacent devices may now make close physical contact with each other, and wherein a caretaker attempting to catch a monkey may be protected from attack by adjacent monkeys by the reinsertion of the side walls, or partitions, and wherein a monkey that is being attacked by adjacent monkeys may have a safe area to which to retreat by the insertion of partitions between it and the adjacent aggressive monkeys.

13 Claims, 3 Drawing Sheets 4,736,709

POLE AND CAGE HOUSING FOR LARGE MONKEYS

FIELD OF THE INVENTION

This invention relates to an apparatus for the restraint or "housing" of large or aggressive monkeys on tethers attached to climbing poles within enclosures.

BACKGROUND OF THE INVENTION

The device described by Migler U.S. Pat. No. 4,685,424 for housing monkeys on poles is suitable for small monkeys, such as squirrel monkeys, but would not be suitable for larger and more aggressive monkeys commonly used in laboratories, such as rhesus monkeys or cebus monkeys or baboons, for the following six reasons. First, an unwary passerby or careless caretaker standing near the device may be attacked by these more aggressive primates. Second, a caretaker attempting to change the water bottle or to put food into the food cans may be attacked. Third, a weaker monkey may be attacked and injured seriously by adjacent aggressive monkeys because there is no safe area to which it can retreat. Fourth, when a caretaker attempts to catch a monkey he may be attacked by adjacent monkeys attempting to "protect" the monkey being caught. Fifth, if a monkey breaks loose from its tether it would be free to escape from the device. Sixth, since larger monkeys require more space than smaller monkeys, and therefore a larger apparatus, Migler's unit would be very large, difficult to move, impossible to move through an ordinary doorway, and too large to be cleaned in a conventional cage cleaner.

The present invention, which was disclosed by Migler in Disclosure Document No. 156,079, overcomes these deficiencies. The invention is comprised of a pole-housing device containing two climbing poles to which monkeys can be attached by tethers and are able to make close physical contact with each other without their tethers becoming entangled; perches on which the monkeys may sit; a door or removable panel at each end providing access to each individual monkey; removable side walls; whereby a plurality of such pole-housing devices may be placed alongside each other, connected together by conventional means, and their side walls removed, permitting monkeys in adjacent devices to make close physical contact with each other, and whereby the side walls, or other partitions may be reinserted between adjacent monkeys when it is observed that they fight with each other, thus providing the weaker monkey with a safe area, and whereby the side walls or partitions may also be inserted between monkeys when a caretaker wishes to catch a monkey, thereby preventing his being attacked by adjacent monkeys.

SUMMARY OF THE INVENTION

This invention is a device for the "housing" of large or aggressive monkeys, comprising horizontal support means to which are secured a plurality of vertical support means; climbing pole support means attached to said horizontal support means; a plurality of vertical climbing poles fixedly attached to said climbing pole support means; a plurality of perch support means attached to said horizontal support means; a plurality of perches attached to said perch support means; a ceiling and floor fixedly attached to said horizontal support means; a plurality of doors or removable panels attached to said vertical support means; a plurality of side wall support means fixedly attached to said horizontal support means; removable side walls fixedly secured in said side wall support means; means to link a plurality of such devices together when they are placed with their side walls adjacent to each other; a tether, slidably attached to each of said climbing poles by a ring, having a collar at the other end of the tether, whereby each monkey that is restrained by a collar is able to climb up and down the climbing pole to which it is attached, and is able to make close physical contact with the other monkey in the device similarly tethered to its climbing pole without their tethers becoming entangled; and whereby a plurality of such devices may be fixedly connected to each other with their side wall support means adjacent to each other, permitting the monkeys in adjacent devices to make close physical contact with each other when their side walls are removed.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE DRAWINGS

Figure 1:
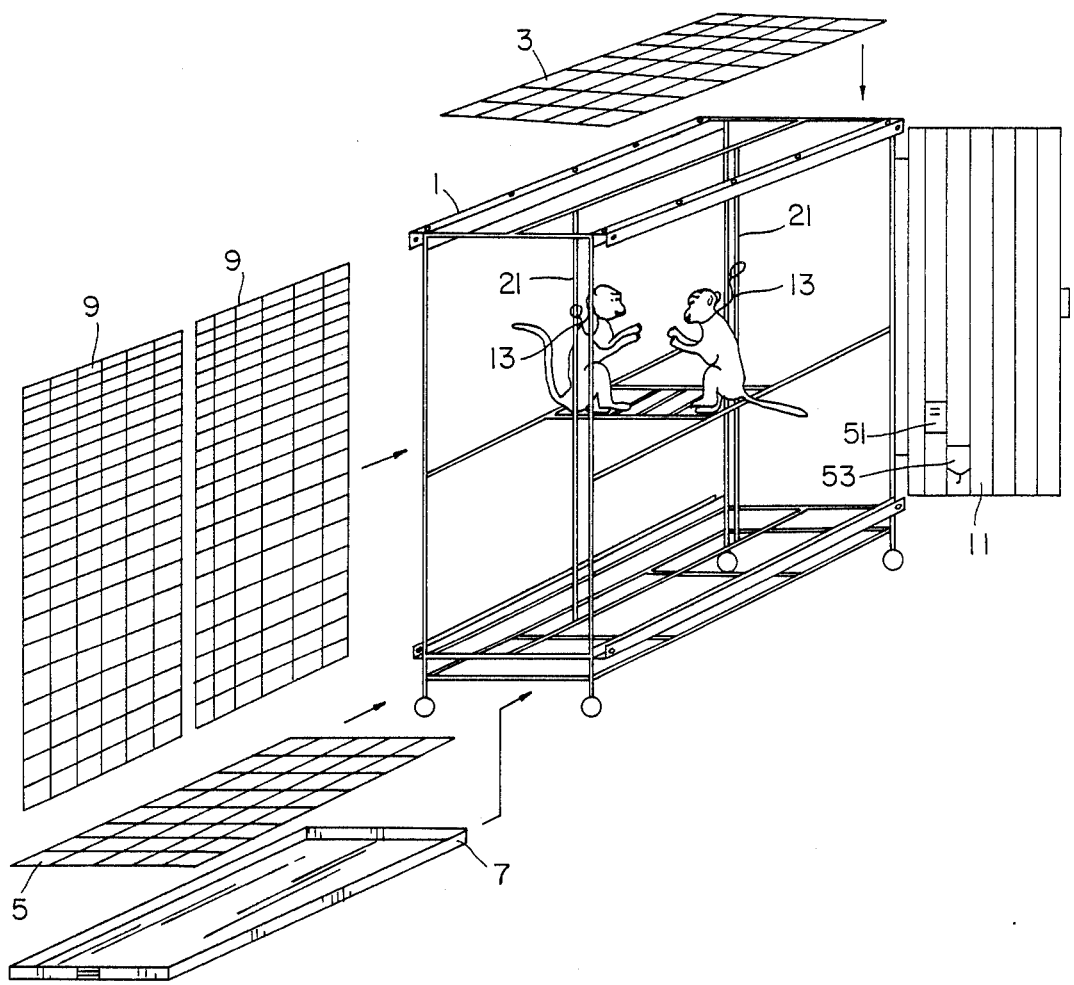
FIG. 1 is a perspective, "exploded" view of a two-monkey pole-housing device.

Referring now to the drawings in FIG. 1 in detail, there is shown an "exploded" perspective view of the main structure of a two-monkey pole-housing device 1, as well as its ceiling 3, which is normally secured to the top of the main structure 1, its floor 5, which is normally secured on the bottom of the main structure 1, its waste pan 7, which is normally secured underneath the floor 5, its removable side walls 9 which are normally secured to the sides of the main structure 1 (only one set of side walls is shown in the figure, another set being secured to the other side of the main structure and not shown in the figure) and its doors 11 (only one of which is shown in the figure), which are normally hinged to opposite sides of the the main structure 1. Two monkeys are also shown attached to climbing poles 21 by tethers 13.

Figure 2:
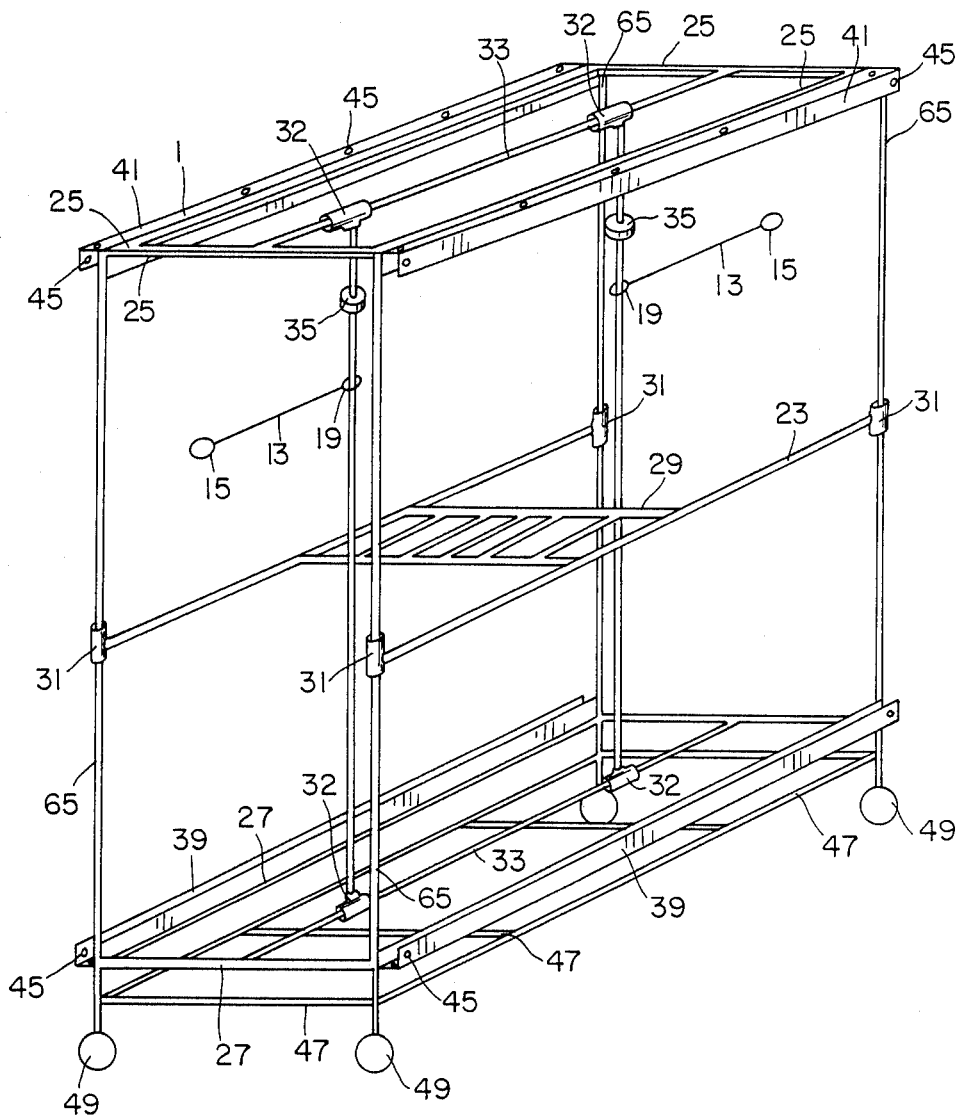
FIG. 2 is an enlarged perspective view of the main stucture of a two-monkey pole-housing device.

Referring now to FIG. 2 in detail, there is shown an enlarged perspective view of the main structure 1 of a pole-housing device for two monkeys constructed in accordance with the principles of the present invention. A tether 13, which may be a chain or a cable, and having one or more rotatable joints, and also having a spring clip, sliding bolt or other means allowing quick disconnection of a collar, is attached at one end to a collar 15, around the neck of a monkey (not shown) and at the other end to a ring 19 that fits loosely around a vertical climbing pole 21.

The tether 13 may have similar means for quick disconnection from the ring 19. The device contains two climbing poles 21, each having a monkey tethered to it. Each monkey can climb up and down its climbing pole 21 with the ring 19 sliding freely up and down. The monkeys can also rotate about their tethers 13 freely due to the rotatable joints, without their tethers becoming twisted. Perch support members 23 are secured to vertical support members 65. A perch 29 is secured to the perch support members 23. There may be a plurality of such perches 29 at different heights but only one is shown in the figure. There is a space between the perch 29 and each climbing pole 21 that is sufficient to permit the ring 19 to slide by. In the preferred embodiment the perch support members 23 are secured to the vertical support members by adjustable fittings 31 (of the type sold by the Hollaender Mfg. Co., Cincinnati, Ohio) allowing the perches to be moved to different heights and resecured there. The monkeys can sit on the perches 29. The length of the tethers 13 is such that the collars 15 can partly overlap; consequently the monkeys may make close physical contact with each other without their tethers becoming entangled. The monkeys may then engage in a variety of social behaviors, including play, grooming, huddling and mating. The climbing poles 21 are attached to climbing pole support members 33. The climbing poles 21 can be secured in place by being welded, however, in the preferred embodiment the climbing poles 21 are secured to the climbing pole support members 33 by bolts or adjustable fittings 32, allowing the climbing poles 21 to be moved to a new location either closer or farther apart and then resecured there. In this way two monkeys may be kept far apart if they fight with each other, or if they are being brought together for the first time and a period of adjustment is necessary before close physical contact is permitted. Each climbing pole 21 has a large diameter stop 35 held in place by a set screw. The ring 19 has a smaller diameter cannot pass the stop 35. The set screw may be loosened and the stop 35 lowered or raised and resecured at a new height. This permits the monkey to be restricted to the upper or lower region of the climbing pole 21, if desired. For example, if the monkey has an injury it may be best to restrict it to the lower region of the climbing pole, to prevent climbing. Doors 11 (not shown, see FIG. 1), constructed of solid panel, grating or bars, are attached by hinges to vertical support members 65 at opposite ends of the device. In an alternative embodiment a removable panel may be used in place of a door, especially where space is at a premium in the room in which the device is contained. Each door 11 provides access to a monkey on a climbing pole 21. A conventional food can 51 and water bottle 53 are secured to the outside of each door (as shown in FIG. 1). Lower side wall support members 39 are fixedly attached to lower horizontal support members 27 and upper side wall support members 41 are fixedly attached to upper horizontal support members 25. Side walls 9 (not shown, see FIG. 1) are inserted into the upper and lower side wall support members 41 and 39, and secured in place by bolts inserted through holes 45 in the side wall support members. When inserted into place and secured, the side walls 9 form a continuous wall. The side walls 9 may be constructed of solid panel, grating or bars.

A ceiling 3 (not shown in FIG. 2 but see FIG. 1), constructed of solid panel, grating or bars, is fixedly secured to the upper horizontal support members 25. The ceiling 3 may be welded, or secured by bolts such that it may be removed if desired.

A floor 5 (not shown in FIG. 2 but see FIG. 1), constructed of grating or bars, permitting waste to drop through, is fixedly secured to the lower horizontal support members 27.

Waste pan support members 47 are fixedly secured to lower horizontal support members 27. A removable waste pan 7 (not shown in FIG. 2 but see FIG. 1) rests on the waste pan support members 47.

The device is mounted on legs, or in the preferred embodiment, on wheels 49, which may be locking casters, permitting the device to be rolled to and cleaned in a conventional cage washer.

The device provides a pair of monkeys with the facility to climb and to have close physical contact with each other. The device provides a source of food and water to each monkey on the outside of the device so that a caretaker is not exposed to attack by the monkeys. The walls and doors of the device protect unwary persons from attack by the monkeys. The walls, doors, ceiling and floor of the device prevent monkey from escaping if they break free of their tethers. The poles and tethers of the device permit close social interaction between the two monkeys in the device. To permit close social interaction between a greater number of monkeys several such devices may be connected together as shown in FIG. 3.

Figure 3:
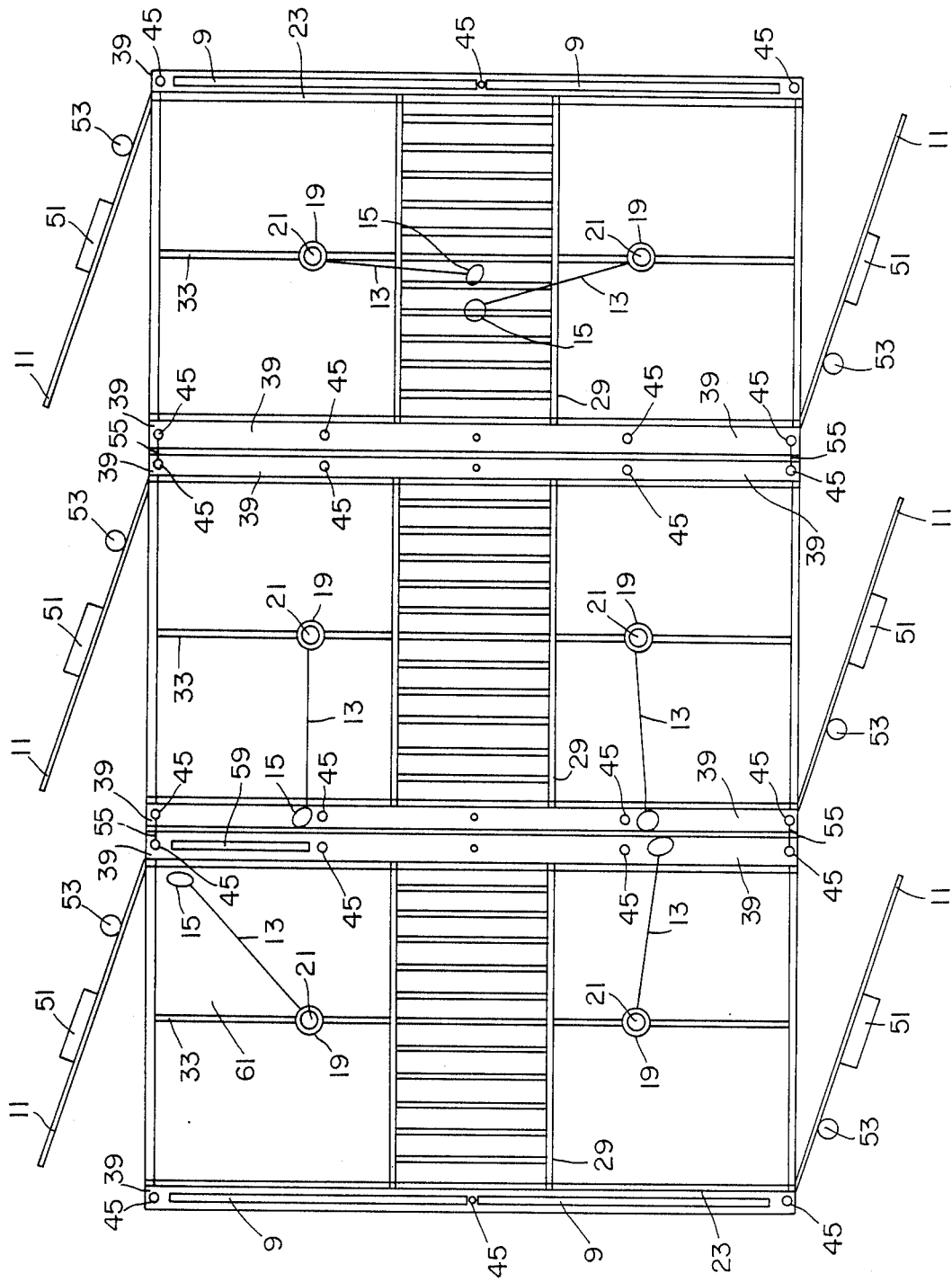
FIG. 3 is a top view of a plurality of two-monkey pole-housing devices connected together.

Referring now to FIG. 3 in detail, there is shown a cross sectional view at the level of the perch, of a plurality of the two-monkey pole-housing devices shown in FIG. 2. The pole-housing devices are aligned with their lower side wall support members 39 next to each other, with the interior adjacent side walls removed, but with the side walls 9 at both ends of the array of pole-housing devices not removed, maintaining a closed structure. The pole-housing devices are connected together by conventional means such as chains, or "u"-shaped bolts threaded at both ends, or padlocks 55 inserted through holes 45 at the ends of the side wall support members 39, or with other conventional means such that they can be easily disconnected. With the interior side walls 9 removed and each monkey tethered to a climbing pole 21 each monkey can have close social contact with the monkey in the adjacent pole-housing device as well as with the monkey in its own pole-housing device, as shown in the figure by the nearness of the collars 15 at the ends of the tethers 13. This is made possible because the length of the tethers 13 is sufficient to permit the collars 15 of the monkeys in the adjacent pole-housing devices to come close or overlap, as well as the collars 15 of the monkeys in the same pole-housing device.

Partitions 59, (which are side walls extending a shorter distance into the device than side walls) or side walls 9 can be reinserted into the side wall support members 39 at any time between adjacent monkeys, and secured in place with bolts inserted through holes 45 in the side wall support members 39. For example, if two monkeys in adjacent devices are found to be fighting with each other, the insertion of a side wall 9 can give complete protection to the weaker monkey; alternatively a partition 59, which projects a shorter distance into the pole-housing device, permits the possibility of a continuation of social interaction, but also provides a safe area 61 for the weaker monkey to which it may retreat if needed. Also, when a caretaker wishes to catch a monkey, side walls 9 or partitions 59 may be inserted on either side of the monkey to be caught, thereby protecting the caretaker from attack by the adjacent monkeys. The figure also shows the doors 11 of each device, in a slightly opened position, with food cans 51 and water bottles 53 mounted on the outside of the doors.

The invention is an improvement over the pole-housing device described by Migler in that it provides for climbing and close physical and social interation by large or more aggressive monkeys, prevents potential attacks on unwary bystanders by being fully enclosed, protects a caretaker from attack by having the food and water supply mounted on the outside of the device, protects weaker monkeys from being attacked by more aggressive monkeys by providing a safe area behind partitions to which the weaker monkey may retreat, provides protection to a caretaker from adjacent monkeys when the caretaker is attempting to catch a monkey by the use of partitions between monkeys, provides for the confinement of a monkey in the event that it breaks free of its tether by the addition of a celing and side walls, provides for the connection and disconnection of any number of two-monkey pole-housing devices into larger units, each two-monkey device being of a sufficiently small size that, when disconnected from the adjacent devices it may easily be wheeled about, or through a doorway, and cleaned in a conventional cage cleaner, and provides a means to restrict the range of climbing of a monkeys by the use of stops on the climbing poles.

In other embodiments the climbing poles and perches may be curved, straight, or may contain angles and may be positioned by any angle.

In other embodiments the two-monkey pole-housing device may have only one climbing pole, and accomodate only one monkey. A plurality of such devices may then be linked together.

The present invention may be embodied in other specific forms without departing from the spirit or essential attributes thereof, accordingly reference should be made to the appended claims rather than to the foregoing specifications as indicating the scope of the invention.

It is obvious that the device can be constructed of various materials that are rigid and resistant to the chewing of the monkeys, for example iron or steel. The diameter of the climbing poles will depend upon the species of monkey, although appproximately a one inch diameter will be sufficient in most cases. The absolute dimensions of each two-monkey pole-housing device may vary, but in the preferred embodiment the height of the climbing pole of a single pole-housing device is approximately six feet, the width (across the door) is approximately two feet, and the depth (across the side walls) is approximately four feet. In another embodiment the plurality of pole-housing devices shown linked together in FIG. 3 may be constructed as a single unit without linking and unlinking means.

I claim:

1. A device for the restraint or "housing" of monkeys, comprising;
   (a) a lower horizontal support member having a perimeter;
   (b) an upper horizontal support member having a perimeter;
   (c) a plurality of vertical support members each having a first and second end, wherein the first ends are attached to the perimeter of said lower horizontal support member and the second ends are attached to the perimeter of said upper horizontal support member;
   (d) at least one upper climbing pole support member having a first and second end each attached to the perimeter of the upper horizontal support member;
   (e) at least one lower climbing pole support member having a first and second end each attached to the perimeter of the lower horizontal support member;
   (f) at least one vertical climbing pole having first and second ends attached at said first end to said lower climbing pole support means and at said second end to said upper climbing pole support means;
   (g) a floor attached to said lower horizontal support member;
   (h) a ring slidably attached to each of the at least one climbing pole;
   whereby one end of a tether is attached to said ring and another end of the tether is attached to a collar holding an individual monkey that is restrained by the collar and is free to climb up and down each of the at least one climbing pole to which the right is attached, and also permitting a second monkey similarly attached to make close social and physical contact without their tethers becoming entangled.

2. The device of claim 1 having
   (a) waste pan support members attached to said lower horizontal support member;
   (b) detachable waste pans supported by said waste pan support members.

3. The device of claim 2 having at least one perch attached to said vertical support members.

4. The device of claim 3 having a plurality of doors or detachable panels attached to said vertical support means or attached to said upper and lower horizontal support means.

5. The device of claim 4 having
   (a) side wall support members attached to upper and lower horizontal support members;
   (b) a plurality of detachable side walls slidably insertable into said upper and lower side wall support members, with means to secure said side walls in place on said side wall support members such that the side walls form a continuous wall;
   whereby the side walls and door or detachable panels form a complete enclosure around all sides of the device, protecting an unwary person from attack, and whereby an individual monkey can be caught by a caretaker without being attacked by the other monkey in the device.

6. The device of claim 5 having food and water supply means.

7. The device of claim 6 having at least one slidably adjustable stop fixedly attached to each climbing pole, each stop having a diameter greater than that of the ring on the pole, preventing the passage of the ring past the stop, whereby a monkey may be restricted to a selected part of the climbing pole.

8. The device of claim 7 having wheel means.

9. The device of claim 8 having horizontally slidably adjustable vertical climbing poles fixedly attached to said upper and lower climbing pole support members permitting the distance between climbing poles to be adjusted.

10. The device of claim 9 having vertically slidably adjustable perches attached to said vertical support members permitting the height of each perch to be adjusted.

11. The device of claim 10 having a detachable ceiling attached to said upper horizontal support member.

12. The combination of two or more devices of claim 11 attached to each other by attachment means wherein adjacent side wall support members of separtate devices of claim 9 placed in juxtaposition to each other are attached together, wherein the side walls may be removed permitting monkeys in adjacent devices to make close physical contact with each other, as well as with any other monkey in its own device, and said side walls may be reinstalled, if desired, to protect a monkey from attack by adjacent monkeys by providing it with a safe area into which it can go and be out of the reach of adjacent monkeys, or to protect a caretaker from attack by adjacent monkeys when the caretaker is attempting to catch a monkey.

13. The device of claim 12 having partitions that can be secured on said side wall support means, said partitions extending a shorter distance into the device than said side walls, whereby an individual monkey can have a safe area into which it can go and be out of the reach of adjacent monkeys, or be able to resume close physical and social contact with adjacent monkeys should it desire to do so, and whereby a caretaker can be protected from attack by the adjacent monkeys when the caretaker is attempting to catch a monkey.

* * * * *